(12) United States Patent
Martin et al.

(10) Patent No.: US 7,912,201 B2
(45) Date of Patent: *Mar. 22, 2011

(54) DIRECTORY ASSISTANCE DIALOG WITH CONFIGURATION SWITCHES TO SWITCH FROM AUTOMATED SPEECH RECOGNITION TO OPERATOR-ASSISTED DIALOG

(75) Inventors: John M. Martin, Austin, TX (US); Robert R. Bushey, Cedar Park, TX (US); Hisao M. Chang, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1017 days.

This patent is subject to a terminal disclaimer.

(21) Appl. No.: 11/559,350

(22) Filed: Nov. 13, 2006

(65) Prior Publication Data

US 2007/0121883 A1 May 31, 2007

Related U.S. Application Data

(63) Continuation of application No. 11/223,172, filed on Sep. 9, 2005, now Pat. No. 7,136,476, which is a continuation of application No. 10/927,922, filed on Aug. 27, 2004, now Pat. No. 7,050,560, which is a continuation of application No. 10/120,809, filed on Apr. 11, 2002, now Pat. No. 6,792,096.

(51) Int. Cl.
*H04M 3/42* (2006.01)

(52) U.S. Cl. .............. 379/218.01; 379/88.01; 704/225
(58) Field of Classification Search ............ 379/218.01, 379/88.01; 704/275
See application file for complete search history.

(56) References Cited

U.S. PATENT DOCUMENTS

| | | | |
|---|---|---|---|
| 4,959,855 | A | 9/1990 | Daudelin |
| 4,979,206 | A | 12/1990 | Padden et al. |
| 5,479,488 | A | 12/1995 | Lennig et al. |
| 5,638,425 | A | 6/1997 | Meador, III et al. |
| 5,659,597 | A | 8/1997 | Bareis et al. |
| 5,812,638 | A | 9/1998 | Muller |
| 5,892,820 | A | 4/1999 | Armstrong et al. |
| 5,987,408 | A | 11/1999 | Gupta |
| 5,987,414 | A | 11/1999 | Sabourin et al. |
| 6,122,361 | A | 9/2000 | Gupta |
| 6,243,684 | B1 | 6/2001 | Stuart et al. |
| 6,256,630 | B1 | 7/2001 | Gilai et al. |
| 2002/0143548 | A1 | 10/2002 | Korall et al. |
| 2003/0139925 | A1 | 7/2003 | Anderson et al. |

*Primary Examiner* — Quynh H Nguyen
(74) *Attorney, Agent, or Firm* — Jackson Walker L.L.P.

(57) ABSTRACT

A method of providing a caller with a directory assistance dialog. The dialog is configurable, at any level of the dialog, from an automated speech recognition (ASR) dialog to an operator-assisted (OP) dialog. The dialog is handed off to an operator if any level of the speech recognition dialog fails. Also, a configuration switch may be set to cause the dialog to be handed off to an operator even if a response at some level of the ASR dialog is successfully recognized.

10 Claims, 4 Drawing Sheets

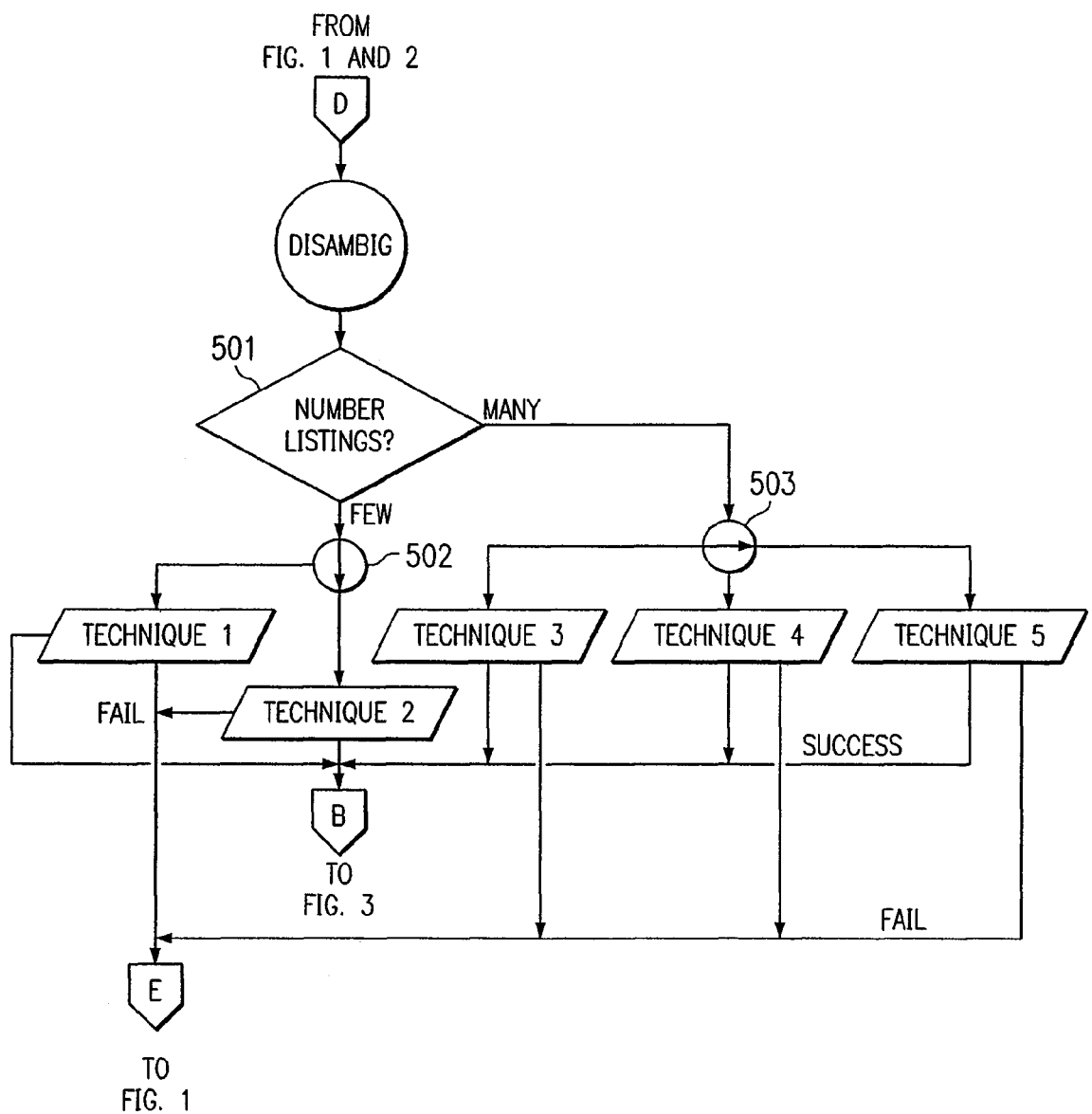

DIRECTORY ASSISTANCE DIALOG WITH CONFIGURATION SWITCHES TO SWITCH FROM AUTOMATED SPEECH RECOGNITION TO OPERATOR-ASSISTED DIALOG

CROSS REFERENCE TO RELATED APPLICATION

This application is a continuation from U.S. patent application Ser. No. 11/223,172, filed Sep. 9, 2005 now U.S. Pat. No. 7,136,476, which is a continuation of U.S. patent application Ser. No. 10/927,922, filed on Aug. 27, 2004, now U.S. Pat. No. 7,050,560, which is a continuation from U.S. patent application Ser. No. 10/120,809, filed on Apr. 11, 2002, now U.S. Pat. No. 6,792,096, the contents of all of which are hereby incorporated by reference.

TECHNICAL FIELD OF THE INVENTION

The follwwing invention relates to telecommunication system, and more particularly to automating directory assistance using speech recognition.

BACKGROUND OF THE INVENTION

An early step toward automation of directory assistance was the use of store and forward technology to assist live operators. The caller was asked for a locality by a pre-recorded prompt. The store and forward system stored a compressed version of the caller's response to the prompt, and brought a live operator onto the line. The operator heard a compressed version of the response and then completed the remaining dialog with the caller to provide a unique telephone number More recently another form of automated directory assistance has been developed, which uses automated speech recognition technology to recognize a locality from the caller's response to a prompt. In a typical system, if the speech recognition is successful, the system asks for the listing, puts an operator on the line, populates the operator's workstation display with the recognized locality, and plays a recorded compressed version of the caller's response to the listing question. The operator then conducts the remaining dialog.

Systems have been developed that attempt to carry the speech recognition through the entire dialog of locality, database listing, clarification, and disambiguation. Recognition success rates have increased but are not 100%. The conventional approach to improving the success rate is to "tune" the system by recording caller's responses and using them to expand the speech recognition capability.

The likelihood of failed speech recognition requires that the system be capable of defaulting to an operator. The conventional approach is to automatically hand off the call to a live operator after a failed attempt at speech recognition. This aspect of automation is described in U.S. Pat. Nos. 4,979,206, 5,479,488, and 5,987,414.

BRIEF DESCRIPTION OF THE DRAWINGS

FIG. 5 illustrates an example of a sub-dialog for the disambiguation process of FIG. 1 or FIG. 2.

DETAILED DESCRIPTION OF THE INVENTION

Figure 1:
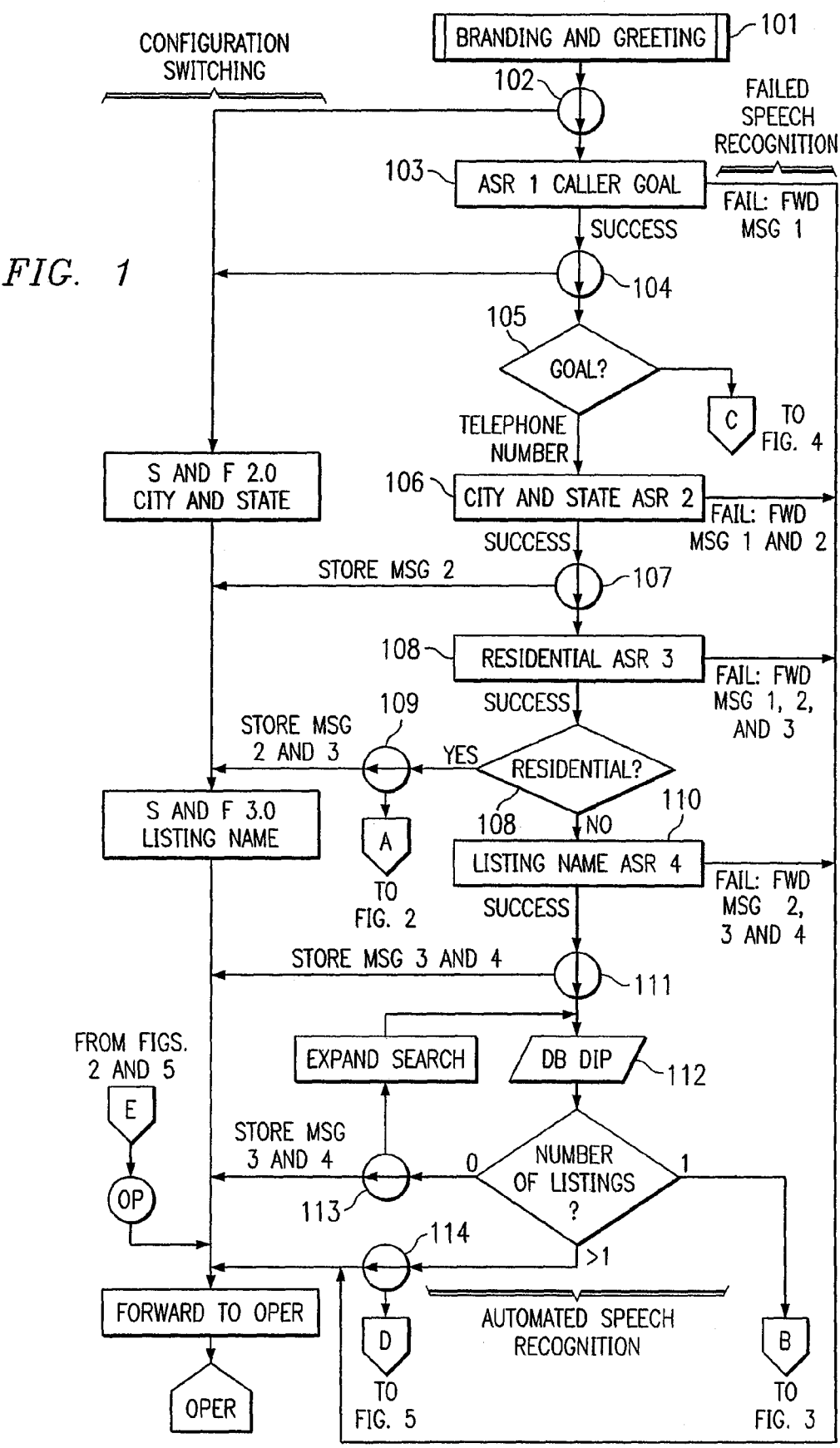
FIG. 1 illustrates the basic dialog of a method of controlling the level of directory assistance automation, using configuration switches in accordance with one aspect of the invention.

The method described herein provides a path of service evolution from operator-assisted (OP) directory assistance to fully automated speech recognition (ASR) directory assistance. In the example of FIG. 1, the OP path uses store and forward (SF) techniques, but other operator-assisted techniques could be used.

As illustrated in FIG. 1, in response to a caller's dial-up for directory assistance, a dialog with the caller conditionally proceeds, continuing with an ASR dialog so long as the recognition is successful. At any step, if the recognition is not successful, the unrecognized responses are stored and forwarded to an OP path. This permits the level of automation to vary according to the particular call.

In addition to conditionally progressing on the basis of ASR success or failure, the dialog is implemented with "configuration switches", which can be set so that branching out of ASR can be caused. By setting each switch, the dialog may be configured at any one of various stages of the dialog. The switches may be set such that a given configuration is implemented for all calls. Alternatively, the switches can be set so that any particular caller's dialog can branch from ASR to SF service at any given point in the call. These switches are "software switches" in the sense that the method of FIG. 1 is computer-implemented and under control of a computer program.

As explained below, a configuration switch may be set to cause a branch to the SF path, even after a particular question in the ASR dialog has been responded to and the response recognized. This permits the service provider to collect and tune the ASR dialog, while continuing to maintain a satisfactory level of service for callers.

The directory assistance service provider can monitor ASR success rates, which permits a decision to implement full automation, or to advance or retract the level of automation, to be based on success rates. Because this step-wise conditional directory assistance process is under program control, the system can monitor its own performance and return to an earlier more successful level of automation if performance falls below a threshold of success.

FIG. 1 illustrates the basic dialog of a method of controlling the level of directory assistance automation, using configuration switches in accordance with one aspect of the invention. A fully automated path is down the center of FIG. 1 through ASR sub-dialogs 1, 2, 3, and 4 and a database search.

Each of sub-dialogs 1-4 is associated with an ASR question, in which the caller is prompted for a response. ASR techniques are used to attempt to recognize the response. The actual speech recognition process can be accomplished using various techniques and algorithms used today, or to be developed, in the art of speech recognition.

A number of configuration switches 102, 104, 107, 111 permit the service provider to branch the remainder of the dialog out of ASR to SF. On the SF path, prompts elicit responses from the caller, which are stored and forwarded to an operator. If all switches are set for no automation, the entire dialog is a simple SF process to an operator who queries a database. On the other hand, if all switches are set for full automation, the responses provided by the caller result in retrieval of a telephone number from the database. Setting only some of the switches results in various intermediate levels of automation. At the same time, regardless of the level at which the dialog is handed off to an operator, the system continues to collect and attempt to recognize responses prior to that point, so that the ASR can be tuned.

As stated above, the configuration switches can be self-monitoring, permitting the directory assistance process to be automatically configured for all calls or on a per call basis, at any level. However, if desired, the same switches could be set by the service provider, based on performance reports of ASR success rates.

The method illustrated in FIG. 1 begins with a branding and greeting message 101, in which the caller is prompted to state the desired service (the goal). A first configuration switch 102 can be set so that the dialog either branches to a SF path or proceeds down the ASR path.

On the ASR path, a first speech recognition process 103 attempts to recognize the caller's goal. If the attempt fails, the recorded response is forwarded to an operator. If the attempt is successful, the dialog proceeds through a next configuration switch 104, which again determines whether the dialog continues along the automated or operator-assisted path.

It should be understood from FIG. 1 that even if the recognition at step 103 is successful, the configuration switch 104 can be set to cause a branch to the operator-assisted path. This might be the case, if success rates for the next question of the dialog were low. Thus, at a number of levels during the dialog, there are two ways in which a call can become an operator-assisted call: following a failed voice recognition response or if a configuration switch is set.

In Step 105, it is determined whether the caller's goal, as recognized in Step 103, is "reverse directory assistance" (RDA). If so, the directory assistance process branches to an RDA process, described below in connection with FIG. 4. For purposes of this description, it is assumed that RDA is the only goal other than "telephone number", but other services and branching to processes other than RDA are possible.

In Step 106, the caller is prompted for, and responds with, a city and state. If the speech recognition fails, the recorded responses to both Questions 1 and 2 are forwarded to an operator. If the speech recognition is successful, a next configuration switch 107 determines whether the dialog continues along an automated or SF path.

At Step 108, the caller is prompted to state whether the desired telephone number is residential. If the speech recognition of the response fails, the recorded responses to Questions 1-3 are forwarded to an operator. If the speech recognition is successful, the rest of the dialog depends on whether the answer is "yes" or "no".

If the answer to Question 3 is "yes" (the number is residential), a next configuration switch 109 determines whether the dialog continues to a sub-dialog for residential listings or to the SF path. An automated path for residential listings is described below in connection with FIG. 2. Other sub-dialogs, including an operator-assisted dialog could be used for residential listings.

Step 108 is optional. The branching of FIG. 1 enables the service provider to provide a different mode of service for residential listings as opposed to business listings, which tend to be easier to obtain. It also permits different databases to be searched for the two types of listings. Other embodiments of the invention are possible, in which no distinction is made between residential and non-residential listings, and both proceed along the main path of FIG. 1.

If the answer to Question 3 is "no" (the number is not residential), at Step 110, the caller is prompted for the listing name. If the speech recognition fails, the recorded responses to Questions 2-4 are forwarded to an operator. If the speech recognition succeeds, a next configuration switch determines whether the dialog continues along the automated path or branches to the SF path.

Continuing on the automated path, Step 112 is performing a database search for the number. If desired, the database search can be for frequently requested listings only. The search is typically performed as a single query or "dip", but various searching techniques may be used.

If the result of the search is a single number, the process continues to a give-out process, described below in connection with FIG. 3. If the search results in no listing, a next configuration switch 113 determines whether the search is to be expanded or whether the dialog branches to SF. If the search results in more than one listing, a configuration switch 114 determines whether the dialog proceeds to a disambiguation process (described below in connection with FIG. 5) or to SF. If the configuration switch 114 is set for SF, the operator's workstation display is populated with the candidate listings.

Calls whose responses have been handed off to an operator, either after a failed attempt at speech recognition or by a switch, are delivered to an operator. The operator then queries the database.

As indicated in Step 115, responses leading to both successful and failed attempts at speech recognition are collected. These responses are then used to tune the speech recognition process.

Figure 2:
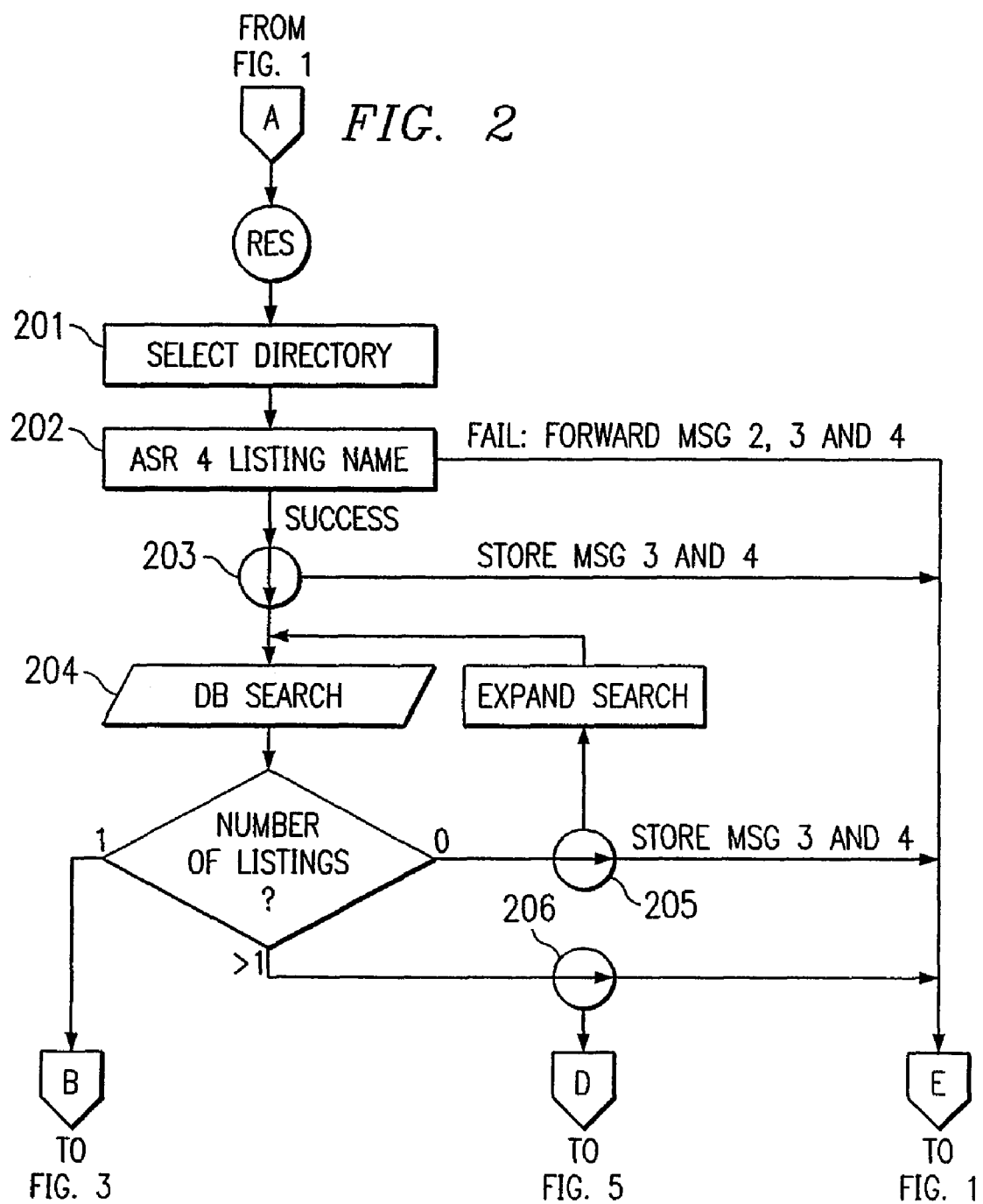
FIG. 2 illustrates an example of a sub-dialog for callers who indicate that they desire a residential listing in response to Question 3 of FIG. 1.

FIG. 2 illustrates an example of a sub-dialog for callers who indicate that they desired a residential listing in response to Question 3 of FIG. 1. In Step 201, an appropriate directory is selected. In Step 202, an ASR process prompts the caller for a listing, and attempts to recognize the response. If the attempt fails, the dialog defaults to SF. If the attempt succeeds, a configuration switch 202 determines whether the call shall proceed as ASR or branch to SF. If switch 202 is set for ASR, Step 204 is performing a database search. The following steps depend on the number of listings obtained from the search. If a single listing is obtained, the number is given out to the caller, a process that may be implemented as described below in connection with FIG. 3. If no listings are obtained, a configuration switch 205 determines whether the search is to be expanded or whether the dialog branches to SF. If more than one listing is obtained, a configuration switch 206 determines whether the dialog branches to SF or proceeds to a disambiguation process. The disambiguation process may be performed in the manner explained below in connection with FIG. 5.

Figure 3:
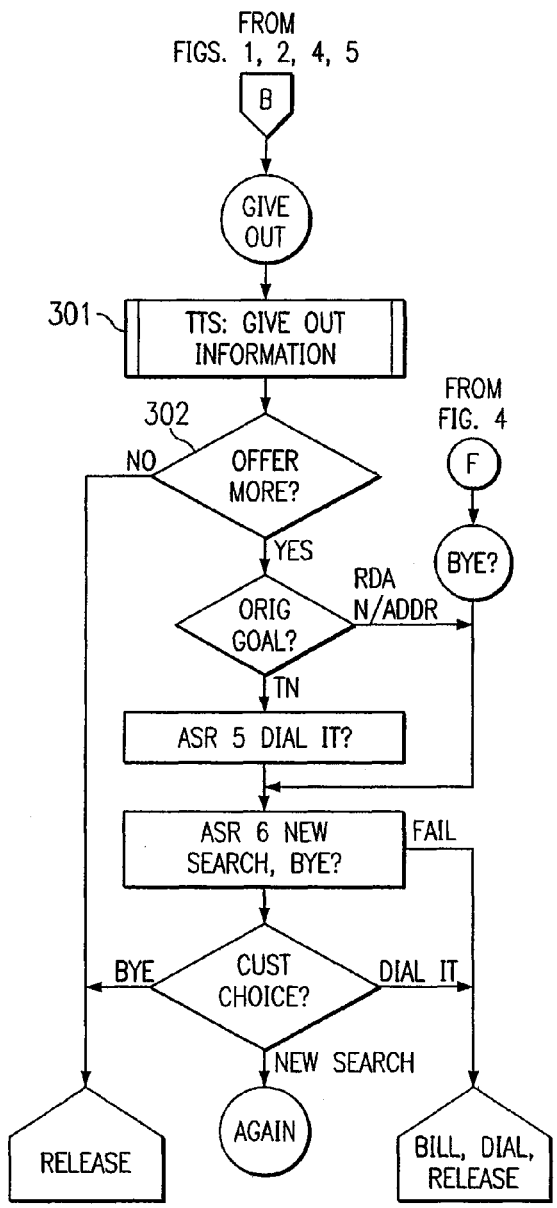
FIG. 3 illustrates an example of a sub-dialog for the give-out process of FIG. 1.

FIG. 3 illustrates an example of a sub-dialog that may be used for the give-out process of FIG. 1. In Step 301, a text to speech (TTS) process is used to give out the desired listing. In Step 302, the caller is prompted to indicate any additional services that may be desired. If no more services are desired, the call is released. Other options include automatic dialing or a new search. These options may be implemented with ASR to prompt for, and recognize, the caller's response.

Figure 4:
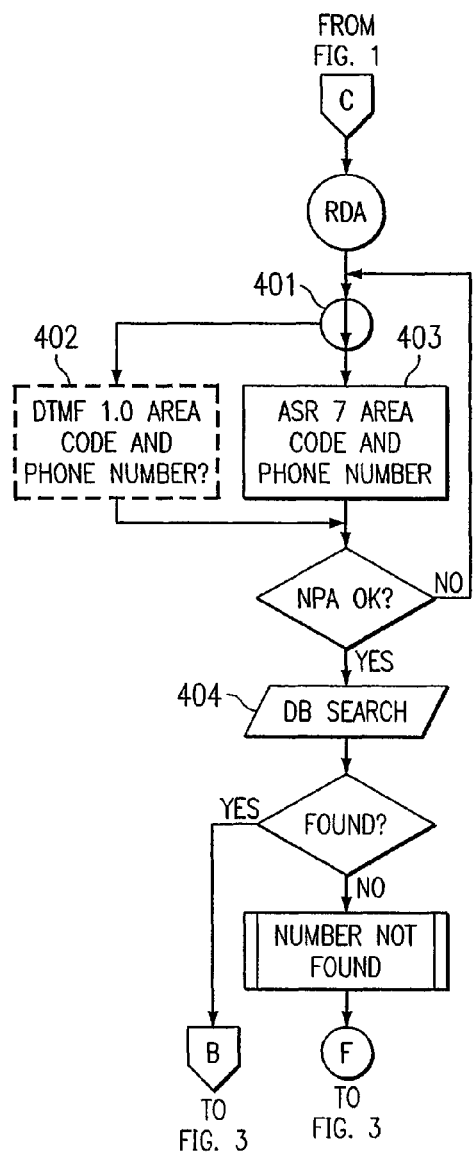
FIG. 4 illustrates an example of a sub-dialog for the reverse directory assistance process of FIG. 1.

FIG. 4 illustrates an example of a sub-dialog that may be used for the reverse directory assistance process of FIG. 1. A first configuration switch 401 determines whether a DTMF process (Step 402) or ASR process (Step 403) is to be used to obtain the listing. If the area code (NPA) is satisfactory, the dialog proceeds to a database search in Step 404. Otherwise, Step 403 is repeated. If the search obtains a listing, it is given out. If not, the caller is informed and the call is released.

FIG. 5 illustrates an example of a disambiguation process that may be used after Step 114 of FIG. 1 or after Step 206 of FIG. 2. There are a number of different ASR disambiguation techniques, and configuration switches may be used to control which is used. Techniques 1 and 2 are appropriate when the number of listings found in a search is small, such as two or three. Configuration switch 502 determines whether Technique 1 or 2 is used. Technique 1 might be: "There are two listings with that name. Do you want the one on Howard Avenue or the one on Armenia Street?" Technique 2 might be: "There are two listings with that name. For the one on Howard Avenue, say 'one'. For the one on Armenia Street, say 'two.'" Similarly, when there are many listings found in a search, the service provider may, using configuration switch 503, choose one of several list-presentation techniques that differ in how the caller navigates the list and indicates his choice. In the example of FIG. 5, switch 503 is used to select between Techniques 3, 4, or 5. With this use of configuration switch 503, the service provider can evaluate the different disambiguation techniques.

OTHER EMBODIMENTS

Although the present invention has been described in detail, it should be understood that various changes, substitutions and alterations can be made hereto without departing from the spirit and scope of the invention as defined by the appended claims.

What is claimed is:

1. A method of facilitating a dialog for a caller, the dialog being switchable from an automated speech recognition (ASR) path to an operator-assisted (OP) path, the method comprising:
    providing a series of ASR sub-dialogs, each sub-dialog including a prompt requesting information from the caller and a response from the caller;
    performing an ASR analysis of each received response, wherein each ASR analysis indicates whether the applicable ASR sub-dialog was successful or unsuccessful;
    after an unsuccessful ASR sub-dialog, branching the dialog to the OP path;
    providing a series of configuration switches, each configuration switch being located after a respective ASR sub-dialog, wherein a configuration switch can be set to branch unconditionally the dialog to the OP path even if the ASR analysis from the respective ASR sub-dialog is successful;
    setting an identified configuration switch to branch unconditionally to the OP path based, at least in part, on a success rate of an ASR sub-dialog that follows the identified configuration switch;
    forwarding responses from a selected ASR sub-dialog to a speech recognition tuning process; and
    tuning an ASR analysis of the selected ASR sub-dialog based at least on the forwarded responses.

2. The method of claim 1, wherein the identified configuration switch is controlled automatically.

3. The method of claim 1, wherein the one or more ASR sub-dialogs include a first ASR sub-dialog prompting the caller for a location response and applying an ASR analysis to the caller's location response and a second ASR sub-dialog prompting the caller for a listing response and applying an ASR analysis to the caller's listing response.

4. The method of claim 3, wherein one of the configuration switches follows the caller's listing response.

5. The method of claim 3, wherein one of the configuration switches follows the caller's location response.

6. The method of claim 1, wherein one of the ASR sub-dialogs prompts the caller to respond whether the listing is for a residence.

7. A method of facilitating a dialog for a caller, the dialog being switchable from an automated speech recognition (ASR) path to an operator-assisted (OP) path, the method comprising:
    facilitating a current ASR sub-dialog with a caller and performing a current ASR analysis of a response received from the caller during the current ASR sub-dialog;
    if the current ASR analysis is unsuccessful, automatically branching the dialog to the OP path;
    controlling a specific configuration switch that follows the current ASR sub-dialog to branch the dialog to the OP path after the current ASR analysis even if the current ASR analysis is successful, wherein said controlling of the specific configuration switch is based on a success rate of an ASR sub-dialog that follows the specific configuration switch;
    if the current ASR analysis is successful, and if the specific configuration switch is set to branch the dialog to the OP path, unconditionally branching the dialog to the OP path following the current ASR sub-dialog;
    if the current ASR analysis is successful, and if the configuration switch is not set to branch the dialog to the OP path, proceeding to a subsequent ASR sub-dialog;
    forwarding multiple responses from the current ASR sub-dialog, to a speech recognition tuning process; and
    tuning the current ASR analysis based at least on the forwarded responses.

8. The method of claim 7, wherein the directory assistance dialog includes one or more ASR sub-dialogs preceding the current ASR sub-dialog.

9. The method of claim 7, wherein the current ASR sub-dialog includes prompting the caller for a location response.

10. The method of claim 7, wherein the current ASR sub-dialog includes prompting the caller for a listing response.

* * * * *